United States Patent [19]
Johary et al.

[11] Patent Number: 5,196,839
[45] Date of Patent: Mar. 23, 1993

[54] GRAY SCALES METHOD AND CIRCUITRY FOR FLAT PANEL GRAPHICS DISPLAY

[75] Inventors: Arun Johary; Tetsuji Oguchi, both of San Jose, Calif.

[73] Assignee: Chips and Technologies, Inc., San Jose, Calif.

[21] Appl. No.: 598,582

[22] Filed: Oct. 15, 1990

Related U.S. Application Data

[63] Continuation of Ser. No. 245,875, Sep. 16, 1988, abandoned.

[51] Int. Cl.$^5$ ................................................. G09G 3/20
[52] U.S. Cl. ........................................ 340/793; 340/805
[58] Field of Search ............... 340/723, 767, 793, 805, 340/812; 358/240, 241, 455, 456, 457, 458, 459

[56] References Cited

U.S. PATENT DOCUMENTS

| | | | |
|---|---|---|---|
| 3,590,156 | 6/1971 | Easton . | |
| 3,845,243 | 10/1974 | Schmersal et al. . | |
| 3,863,023 | 1/1975 | Schmersal et al. . | |
| 3,937,878 | 2/1976 | Judice | 340/793 |
| 4,021,607 | 5/1977 | Amano | 340/767 |
| 4,036,553 | 7/1977 | Borel et al. | 340/793 |
| 4,121,283 | 10/1978 | Walker . | |
| 4,193,095 | 3/1980 | Mizushima | 340/793 |
| 4,323,891 | 4/1982 | Akashi . | |
| 4,338,597 | 7/1982 | Steiner et al. . | |
| 4,399,435 | 8/1983 | Urabe . | |
| 4,427,979 | 1/1984 | Clerc et al. | 340/793 |
| 4,531,160 | 7/1985 | Ehn | 340/793 |
| 4,554,539 | 11/1985 | Graves | 340/793 |
| 4,556,876 | 12/1985 | Shimizu et al. | 340/812 |
| 4,563,676 | 1/1986 | Leininger . | |
| 4,563,746 | 1/1986 | Yoshida et al. . | |
| 4,626,837 | 12/1986 | Priestly . | |
| 4,651,146 | 3/1987 | Lucash et al. . | |
| 4,684,935 | 8/1987 | Fujisaku et al. . | |
| 4,688,031 | 8/1987 | Haggerty . | |
| 4,703,318 | 10/1987 | Haggerty . | |
| 4,716,405 | 12/1987 | Yamaguchi | 340/723 |
| 4,739,313 | 4/1988 | Oudshoorn et al. . | |
| 4,742,346 | 5/1988 | Gillette et al. . | |
| 4,743,096 | 5/1988 | Wakai et al. | 340/793 |
| 4,746,981 | 5/1988 | Nadan et al. . | |
| 4,752,774 | 6/1988 | Clerc et al. | 340/793 |
| 4,808,991 | 2/1989 | Tachiuchi et al. | 340/793 |
| 4,827,255 | 5/1989 | Ishii | 340/793 |

FOREIGN PATENT DOCUMENTS 2085257  9/1984  United Kingdom .

*Primary Examiner*—Alvin E. Oberley
*Assistant Examiner*—Richard Hjerpe
*Attorney, Agent, or Firm*—Townsend and Townsend

[57] ABSTRACT

A controller for providing O to N gray scales at a monochrome display. The monochrome display is of the type having an array of pixels energized by a display voltage over time to generate the gray scales. The controller generates a baseline time and uses the baseline time to provide gray scales at the display. In particular, each pixel is energized at least the baseline time for any gray scale above level 0 to reduce flicker in the display. In one embodiment, the baseline time corresponds to a point on the intensity response curve for the display at which the display exhibits a linear intensity response for a given display voltage versus time. In one embodiment, the baseline time is used to generate pixel on/off data to provide gray scales at the display. In yet another embodiment, the baseline time information is used to generate weighted clock information to provide gray scales at the display. In another aspect, the controller includes a plurality of programmable gray scale generators which provide pixel on/off data, weighted clock information, and black/white pixel data to provide gray scales at the display. One of the gray scale generators is selected and programmed depending on the identity of the display device.

6 Claims, 4 Drawing Sheets

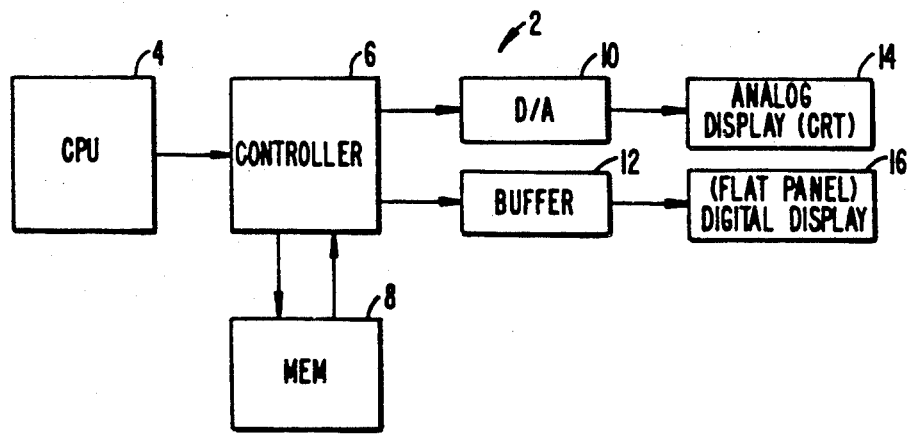
FIG._1A. (PRIOR ART)
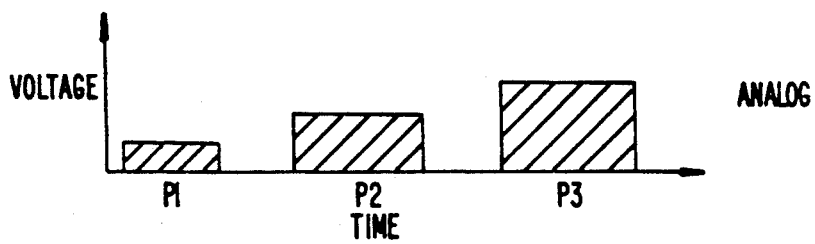
FIG._1B. (PRIOR ART)
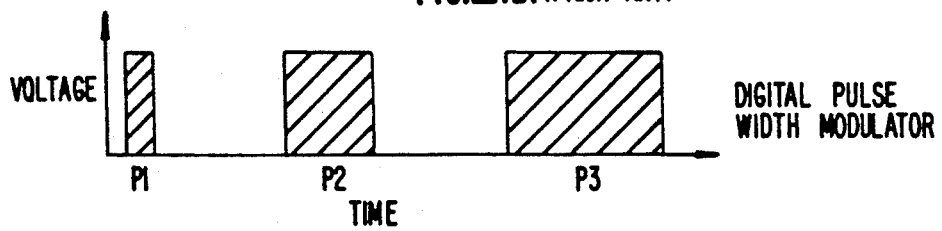
FIG._1C. (PRIOR ART)
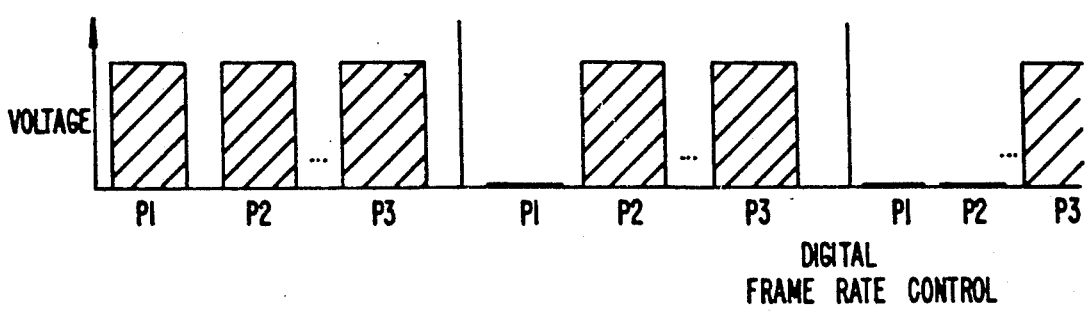
FIG._1D. (PRIOR ART)

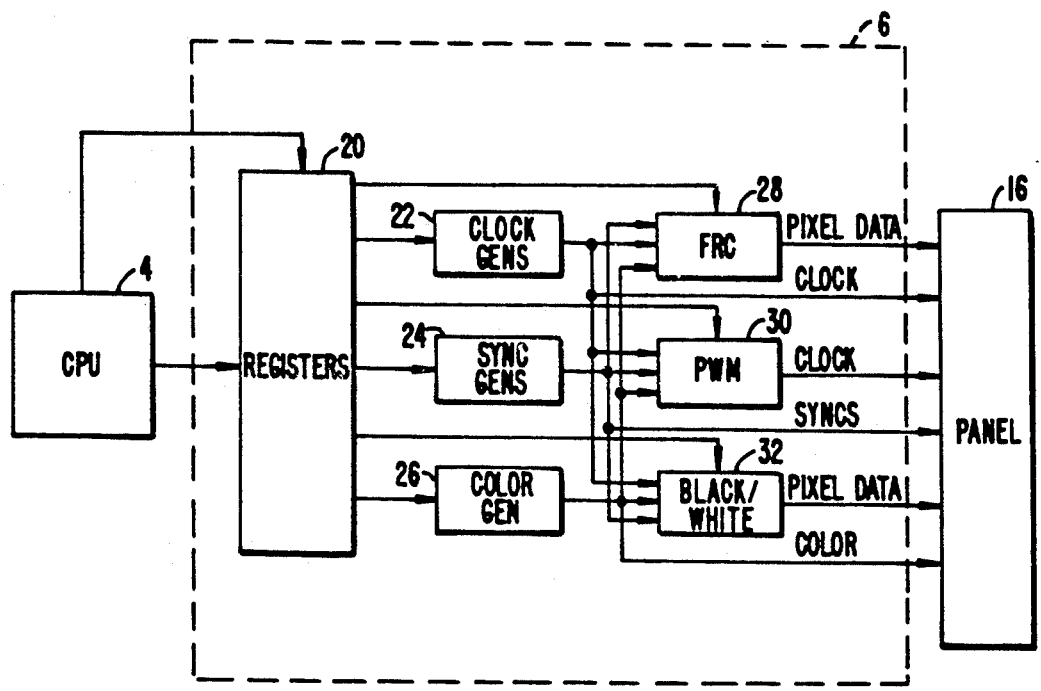
FIG._3.
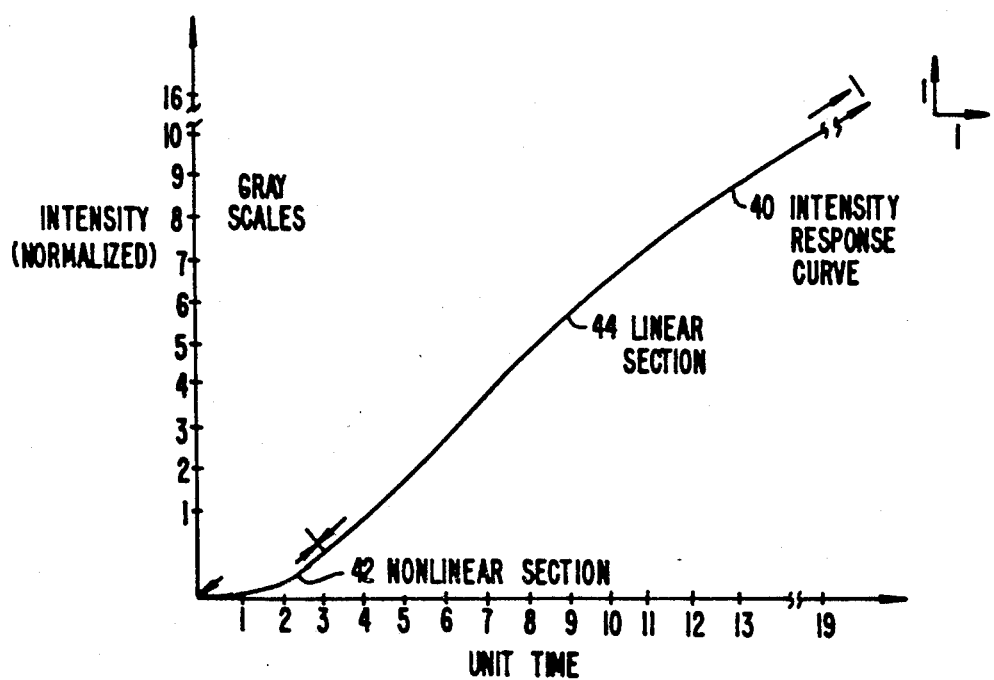
FIG._2.

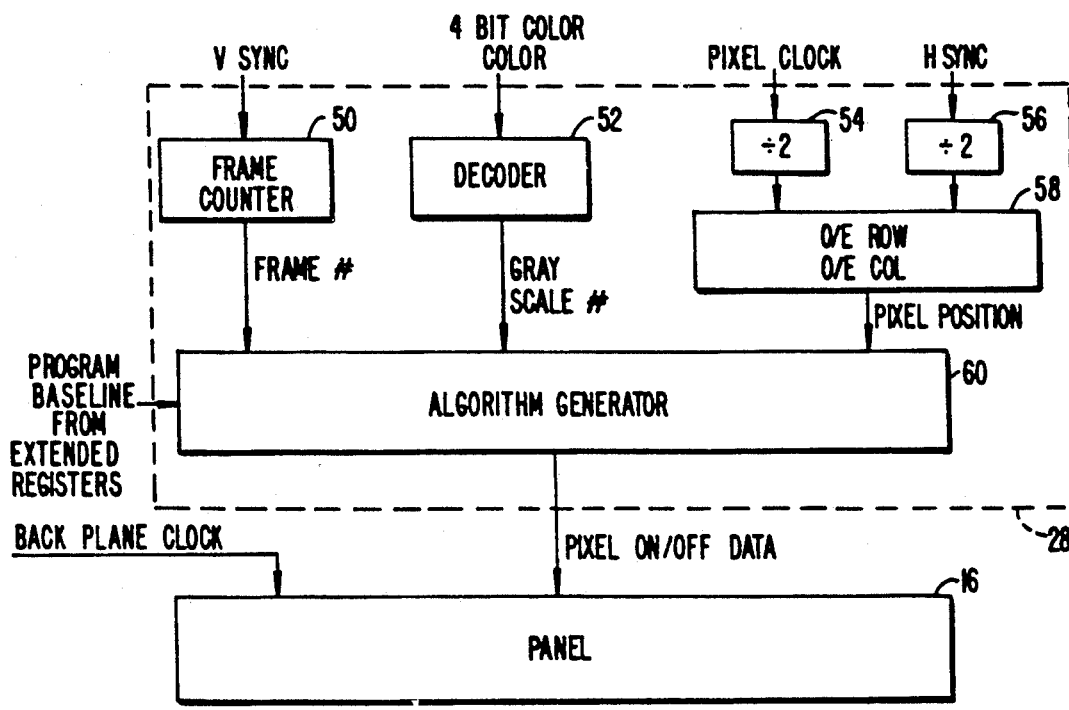
FIG._4.
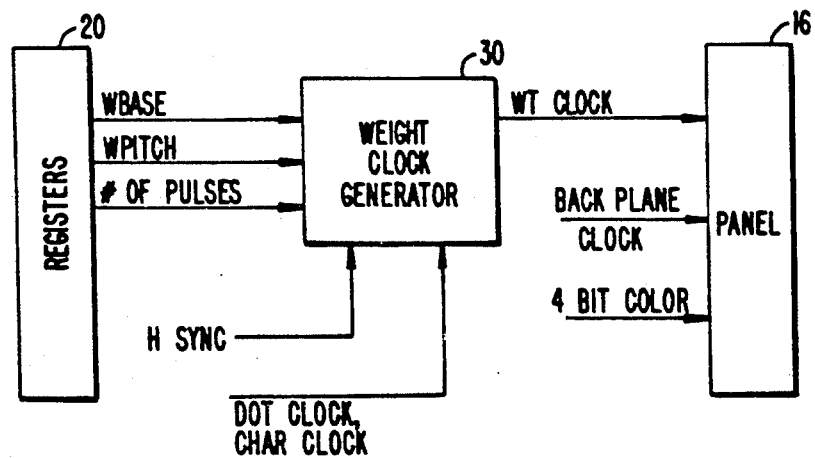
FIG._6.

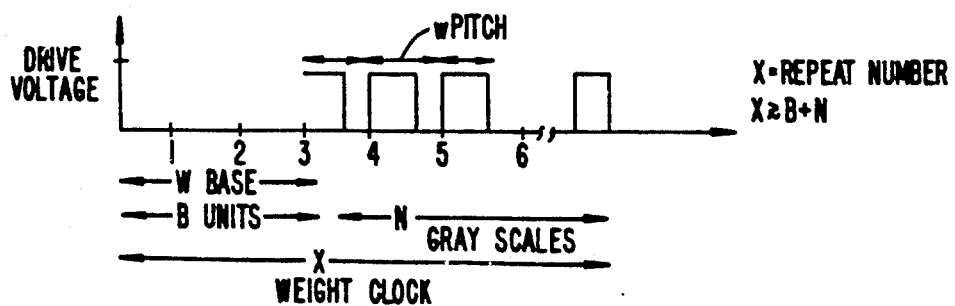
FIG._7.
FOR 16 WAY FRAME RATE CONTROL
FIG._5.

GRAY SCALES METHOD AND CIRCUITRY FOR FLAT PANEL GRAPHICS DISPLAY

This is a continuation of application Ser. No. 245,875, filed Sep. 16, 1988, now abandoned.

This invention relates to a method for generating gray scales for a flat panel display. In particular, gray scales are generated by turning the pixels in a display on for at least a baseline time in order to reduce flicker at a monochrome display.

BACKGROUND OF THE INVENTION

Personal computing systems, such as the one shown in FIG. 1A, employ an eve r increasing number and types of display devices. Those systems commonly include a central processing unit 4 which drives a video controller 6. Controller 6 interacts with a memory 8 to generate video control information. The video control information is usually coupled through a digital to analog converter 10 to drive an analog display 14 or through a buffer 12 to drive a digital display 16.

Among the possible types of displays in use are CRT and flat panel displays. Some of these devices are color and some have no color capability, i.e., are monochrome display devices. Flat panel display devices are typically monochrome devices.

It is often desirable to display an image that, even though not color, possesses some variety in shades so as to be aesthetically and functionally interesting to a user. Many personal computing systems employ gray scales to provide visual differentiation for displayed images.

Three techniques of varying sophistication are known to applicant for generating gray scales at a monochrome display. Where the display is an analog device such as a CRT, the gray scales may be generated by applying different voltage levels for the same units of time, as shown generally in FIG. 1B. Another technique, pulse width modulation (PWM), provides gray scales by varying the time for which a given constant voltage is applied to a pixel as shown in FIG. 1C. Finally, frame rate control (FRC) techniques use a plurality of frames during which the constant voltage may or may not be applied to the pixels in a display. Gray scales are achieved by applying and not applying the constant voltage to specific pixels during specific frames as shown generally in FIG. 1D.

These techniques suffer from a number of limitations when implemented. For example, when a large number of gray scales is desired, the less intense grays remain on for a relatively short period of time, which creates flicker at the display. In addition, flat panel displays are made from differing chemicals and therefore have different intensity response characteristics. This complicates the hardware and software required to provide satisfactory gray scales for a full range of flat panel displays.

Prior art patents known to Applicant neither teach or suggest any satisfactory method for resolving the foregoing problems.

U.S. Pat. No. 4, 688,031 describes the use of color masks having different repetitive dot patterns for even and odd number rows to generate gray scales corresponding to different colors.

U.S. Pat. No. 4,703,318 describes a method of forming a monochromatic image from a digital representation by replacing background and foreground colors with patterns of light and dark dots.

U.S. Pat. No. 3,845,243 describes a method and system for producing gray scales in a display. The display is divided into a number of regions equal to the number of gray scales to be produced. The number of regions excited corresponds to the gray scales produced.

U.S. Pat. No. 3,863,023 describes a technique of varying the on/off time of memory planes to generate graduations of gray corresponding to the original scanned image.

U.S. Pat. No. 3,590,156 discloses a switching system that synchronously addresses a display panel and a memory system to control the duty factor of each display element in accordance with received picture signals.

U.S. Pat. No. 4,742,346 uses a segmented shift register, with one shift register for each column of pixels in a display. Data stored in the registers is transferred to counters through multiplex circuitry. The counters control the application of voltages to the pixel columns.

SUMMARY OF THE INVENTION

The invention is a controller and method for providing 0 to N gray scales at a monochrome display. The monochrome display is of the type having an array of pixels energized by a display voltage over time to generate the gray scales. The controller generates a baseline time and uses the baseline time to provide gray scales at the display. In particular, each pixel is energized at least the baseline time for any gray scale above level 0 to reduce flicker in the display. In one embodiment, the baseline time corresponds to a point on the intensity response curve for the display at which the display exhibits a linear intensity response for a given display voltage versus time.

In one embodiment, the base line time is used to generate pixel on/off data to provide gray scales at the display. In another embodiment, the base line time information is used to generate weighted clock information to provide gray scales at the display. In another aspect, the controller includes a plurality of programmable gray scale generators which provide pixel on/off data, weighted clock information, and black/white pixel data to provide gray scales at the display. One of the gray scale generators may be selected and programmed depending on the identity of the display device.

Additional, features and advantages of the invention will become apparent by reference to the following brief description, the figures, the detailed description and the appended claims.

BRIEF DESCRIPTION OF THE DRAWINGS

FIG. 1A is a block diagram of a data processing system according to the prior art;

FIGS. 1B-1D are stylized illustrations of methods for generating gray scales according to the prior art;

FIG. 2 is a graph of an intensity response curve for a typical display showing intensity of display at a given display voltage versus units of time;

FIG. 3 is a block diagram of a data processing system having a controller for generating gray scales according to one embodiment of the invention;

FIG. 4 is a block diagram of a frame rate control circuit for generating gray scales according to one embodiment of the invention;

FIG. 5 illustrates the pixel on/off pattern using frame rate control according to one embodiment of the invention; and FIG. 6 is a block diagram of a pulse width modulation circuit for generating gray scales according to one embodiment of the invention; and FIG. 7 is an illustration of weight clock information generated by a pulse width modulation circuit according to one embodiment of the invention.

DETAILED DESCRIPTION OF THE INVENTION

Among other things, the invention is a controller for generating gray scales for a flat panel display. The invention includes the use of two techniques for generating gray scales in view of the problems encountered by the prior art. First, the controller uses a baseline time such that for any gray scale greater than 0, the pixels in the display will be on for at least the base line time. The base line time is chosen to be long enough such that flicker is effectively eliminated at the display.

The invention also offers a plurality of alternative circuits for generating gray scales. Moreover, these circuits may be selected and programmed depending on the identity of the display device, and therefore the intensity response characteristics of the particular display, used in the processing system.

The invention will now be explained in greater detail by reference to prior art techniques as stylistically summarized in FIGS. 1A-1D. The invention will then be described by reference to circuit diagrams of controllers having frame rate control, pulse width modulation, and black/white circuits for generating gray scales by reference to FIGS. 2-7.

FIG. 1A shows a conventional data processing system 2 having analog and flat panel display capability. Conventional processing system 2 includes a central processing unit 4 that drives a controller 6. Controller 6 interacts with a memory 8 and outputs digital video control information to a digital to analog converter 10 for driving an analog display such as a CRT 14. Controller 6 can also output digital video control information to a buffer circuit 12 for driving a digital display 16 such as a flat panel display.

Prior art display systems have typically utilized three techniques for generating gray scales at a monochrome display to applicants' knowledge. An analog technique, as graphically shown in FIG. 1B, uses the technique of applying different voltage levels for the same period of time to generate different intensity levels for the pixels in a display. Pulse width modulation techniques as shown illustratively in FIG. 1C, apply a constant display voltage for varying periods of time to provide different gray scales at a display. Frame rate control techniques, as shown in FIG. 1D, apply a constant display voltage for a constant period of time to pixels over a number of frames. The gray scales are achieved by applying or not applying the voltage to selected pixels during successive frames.

Several problems are encountered using these techniques. For example, for frame rate control, the number of frames commonly used has been chosen to correspond to the number of gray scale levels desired. Thus, to obtain 16 gray scales (i.e., 0-15) requires the use of 16 frames, each at 50 hz, in the prior art. The prior art frame rate control systems have used 0 "on" frames to generate a level 0 gray scale, 1 "on" frame to generate a level 1 gray scale and so up to N frames on to correspond to an N level gray scale. One problem encountered is that for the lower level gray scales, such as a level 1 gray scale, pixels are on only about three to four times per second which creates observable flicker at the display.

Another problem encountered is the fact that different liquid crystal displays may use different chemicals. Thus, the intensity response of each such liquid crystal device with respect to voltage and time is different. Moreover, as shown in FIG. 2, the liquid crystal displays are known to be non-linear for an initial energization period. That is to say, during some initial units of time, any increase in the time for which a display voltage is applied will not give a corresponding marginal increase in the intensity of display. However, these intensity response curves for flat panel displays do have the known characteristic of transitioning from this non-linear response to a linear response after a certain time. Thereafter, for each unit of time for which the display voltage is applied, there will be a corresponding unit increase in the level of intensity of display. This period of time is referred to hereinafter as the linear transition time of the intensity response curve.

In several embodiments of the invention herein, the baseline time for level 1 through level N is chosen to be equal to or greater than this linear transition time.

FIG. 3 shows one embodiment of a data processing system 2 having a controller 6 according to one embodiment of the invention. Controller 6 includes a frame rate control circuit, a pulse width modulation circuit and/or a black/white circuit for generating gray scales while resolving the aforementioned problems of the prior art.

As shown in FIG. 3, a central processing unit 4 provides information to registers 20 in controller 6. The registers are conventional registers as used within a controller or may be alternative registers as described in our co-pending application entitled "Compensation Method and Circuitry for Flat Panel Graphics Display". Registers 20 are coupled to hardware circuits and to the circuits in controller 6 for generating gray scales at the display. Registers 20 may be coupled, for example, to clock generator circuits 22, sync generator circuits 24, and color generator circuits 26.

For the embodiment of the invention shown in FIG. 3, clock generator circuit 22 provides clock information to a frame rate control circuit 28, a pulse width modulation circuit 30, and a black/white circuit 32. Likewise, sync generator circuit 24 provides sync information to frame rate control circuit 28, pulse width modulation circuit 30, and black/white circuit 32. Likewise, the color generation circuit 26 provides digital color information to frame rate control circuit 28, pulse width modulation circuit 30, and black/white circuit 32.

In the preferred embodiment, the baseline time is encoded in a frame number and color value table in frame rate control circuit 28. The table may be conventionally implemented in hardware as a programmable logic array, ROM, or with random logic.

In addition, registers 20 generate baseline time information which is provided to pulse width modulation circuit 30 and black/white control circuit 32 to generate gray scale control information. It should be understood that registers 20 could also provide baseline time information to FRC circuit 28 as an alternative embodiment of the invention.

Frame rate control circuit 28 outputs pixel on/off data to a flat panel display 16. The pulse width modulation circuit 30 outputs weighted clock information to panel 16. Black/white circuit 32 outputs pixel data to panel 16. Panel 16 is also fed clock information from clock generator 22, sync information from sync generators 24, and digital color information from color generator 26.

As previously mentioned, baseline time information is provided internally within frame rate control circuit 28 and registers 20 provide baseline time information to pulse width modulation circuit 30 and black/white circuit 32. According to the invention, for each gray scale above level 0, pixels are on for at least the baseline time in order to minimize flicker at the display. For example, for a frame rate control method of generating gray scales, the level 1 gray scale is typically on for one frame according to the prior art. According to the invention, to provide a level 1 gray scale, the pixels will be on for at least a number of frames corresponding to the baseline time. This baseline time can be programmed by registers 20 depending on the identity of panel 16. In general, baseline time for the pulse width modulation and frame rate control circuits can be described in registers. The use of a table for the frame rate control happens to be more efficient in the current implementation.

FIG. 4 is a block diagram of frame rate control circuit 28 for generating gray scale control information according to one embodiment of the invention. Frame rate control circuit 28 outputs pixel on/off data in selected patterns to provide gray scales at panel 16.

Frame rate control circuit 28 receives vertical sync information, four-bit digital color information, pixel clock information, horizontal sync information. Circuit 28 outputs pixel on/off data. The vertical sync information is provided to a frame counter 50 which provides a frame number as output to an algorithm generator 60. The algorithm generator can be a RAM, a ROM, a PLA, or a similar conventional device.

Baseline time information is generated internally from a table in algorithm generator 60 but could be provided from a register (not shown) in a programmable embodiment. The four-bit digital color information is provided to a decoder 52. Decoder 52 outputs gray scale identification information to algorithm generator 60. Pixel clock information is received in a divide-by-two circuit 54. Divide-by-two circuit 54 outputs clock information to a row column circuit 58. Horizontal sync information is received at another divide-by-two circuit 56. Divide-by-two circuit 56 outputs sync information to row column circuit 58. Row column circuit 58 outputs pixel position information that indicates whether or not the pixel is in an odd or even row and an odd or even column.

The baseline information (which is built into the algorithm generator in one embodiment), the frame identification information, the gray scale information and the pixel position information are used by algorithm generator 60 to generate pixel on/off data. The pixel on/off data determines for a given frame and a given gray scale the on/off status of a pixel identified by the pixel position data. The baseline information is used to ensure that the display will be energized for at least the baseline time if the identified gray scale is level 1 or greater. Panel 16 also uses back plane clock information as occurs in a conventional panel.

FIG. 5 shows one pixel on/off pattern for 16 levels of gray scales, i.e., gray scales from level 0 through level 15. It can be seen by reference to FIG. 5 that each gray scale at level 1 or higher has the display energized for at least 3 frames. For example, level 01 (0,0),(1,1) will have the display energized during frames 4, 10 and 16. This technique is in contrast to prior art frame control systems wherein for a level 1 gray scale the display would be energized for only one frame. By having the pixels energized for 3 out of the 19 frames, the method according to the invention has the same repeat rate as a conventional system having only about six gray scales (i.e., $19/3 = 6.33$).

As can be seen by reference to FIG. 5, the display may also be segregated by pixel position information such that pixels in certain rows and columns will be on for three frames and pixels in other rows and columns will be on for three frames. By turning the pixels on over the entire display with essentially a lag factor, flicker is even further reduced. One skilled in the art will readily appreciate in view of this disclosure that other patterns can be used within the scope of the invention.

Refer again to FIG. 4 which shows that baseline information can be provided from extended registers in controller 6 for frame rate control. These extended registers may be programmed based on the identity of the display using conventional techniques to provide baseline information to algorithm generator upon system power up. Baseline information can also be changed depending on the identity of the panel 16. Thus, panels that are more flicker prone can be provided with a higher base line time such that the pixel on time will be increased as necessary starting at the level one gray scale.

Refer again to FIG. 5 where it should be noted that the total number of frames for providing 16 gray scales is 19. Because of the chemical characteristics of most liquid crystal displays, it is desirable that the total number of frames for providing frame rate control should always be an odd number. This choice prevents breakdown of the display chemical which could occur if any pixel should remain in the same voltage state after a complete cycle of frames. According to one embodiment of the invention, the number of frames for the frame control circuit is chosen to be an odd number of frames. For example, the number of frames can be chosen to be the number of base line time units, B, plus the number of gray scale levels N, i.e., $B+N$, if $B+N$ is odd. However, if $B+N$ is an even number, the total number of frames should be $B+N+1$ so that the total number of frames will be an odd number. One skilled in the art would recognize that the frame counter must be reset after the desired number of frames have been displayed.

In order to appreciate the operation of a pulse width modulation circuit according to one embodiment of the invention, refer to FIG. 6. FIG. 6 shows a pulse width modulation circuit that includes a weight clock generator 30. Weight clock generator 30 receives clock information from registers 20. This input clock information includes weight base information, weight pitch information, and other such clock information. This clock information is used to define the number of pulses, pulse width, and other characteristics of the weighted clock signal provided as output from circuit 30. Weight clock generator 30 also receives horizontal sync information from sync hardware (not shown).

Weight clock generator 30 outputs the weighted clock information to panel 16. Panel 16 also receives back plane clock information and four bit digital color information. Panel 16 may be a conventional panel and uses input weight clock information, back plane clock information, and four bit digital color information to generate gray scales according to conventional techniques.

FIG. 7 shows a weight clock signal for providing gray scale control information to panel 16 according to one embodiment of the invention. The weight clock signal includes an initial weight base and a succession of clock pulses. Each clock pulse has a duration defined by the weight pitch. The total number of clock pulses is varied depending on the number of gray scales. According to the invention, a weight base, which corresponds to the baseline information, is provided to weight clock generator 30 to ensure that, for level 1 gray scales and higher, the pixels in the display will be on for a time greater than the duration of the weight base. Similar to the base line information provided for the frame rate control circuit, the weight base is programmable by registers 20. In addition, the weight pitch and the number of pulses can also be programmable by registers 20. Thus, for the embodiment shown in FIG. 5, the weight base, the weight pitch and the number of pulses can be programmed to match the intensity response characteristics and the flicker characteristics of a particular display.

Refer again to FIG. 2. Controller 6 also includes a black/white circuit 32. Black/white circuit 32 is included to provide simple black/white display at panel 16. Black/white circuit 32 may be a conventional comparator circuit that compares the digital color input signal to a threshold. Where the digital color information exceeds the threshold, the pixel data output causes a black display at panel 16. Where the digital color information is less than the threshold, the pixel data causes a white display at panel 16. Black/white circuit 32 may have a threshold that is programmable by registers 20 depending on the identity of the display device.

It should be understood that the frame rate control circuit, the pulse width modulation circuit, and the black/white circuit can be assembled using conventional controller components by one skilled in the art.

Although the invention has been explained by reference to the foregoing figures, it should be understood that additional changes can be made thereto within the scope of the invention. For example, although the embodiment of FIG. 2 includes a frame rate control circuit, a pulse width modulation circuit, and a black/white circuit, it should be understood that a frame rate control circuit or pulse width modulation circuit or a black/white circuit only may be included in a controller having the baseline time programmable. It should also be understood that pixel on/off data may have patterns simpler or more complicated than the pattern shown in FIG. 5. Likewise, different weight clock information can be generated for a pulse width modulation system within the scope of the invention. Thus, it should be understood that the invention is limited only in accordance with the appended claims.

What is claimed is:

1. A controller for controlling a monochrome video display, the monochrome video display comprised of a plurality of pixel elements, the pixel elements having a non-linear response of a first predetermined time period to the application of a predetermined display voltage, the controller providing zero to N gray scale levels of the pixel elements, the controller comprising:

table means for storing zero to N time periods, the N time periods corresponding to the zero to N gray scale levels, wherein the N time periods corresponding to gray scale levels two to N are dependent upon an incremental time period, the incremental time period being determined by the steps of:

determining a minimum baseline time for applying the predetermined display voltage to a pixel element, the minimum baseline time corresponding to the time period necessary to apply the display voltage to charge pixel element to gray scale level one, the minimum baseline time being at least equal to the first predetermined time period during which the pixel has a non-linear response to the predetermined voltage;

determining a maximum time that the display voltage can be applied to a pixel element, the maximum time corresponding to the time period necessary to apply the display voltage to charge the pixel element to the gray scale level N;

subtracting the minimum baseline time from the maximum time;

dividing the result of the subtracting step by N, the maximum gray level, the result being the incremental time; and means for applying the display voltage to the pixel elements for a time equal to the zero to N time periods, wherein time period one is equal to the minimum baseline time and time periods two through N correspond to the minimum baseline time added to the incremental time period multiplied by two through N, respectively.

2. The controller of claim 1 further comprising means for changing the time periods stored in the table means, wherein the time period in the table means can be changed when a different monochrome video display is coupled to the controller.

3. A method for controlling a monochrome display having a plurality of pixel elements so that the display has N different gray levels, each pixel element being characterized by a first period of time for which the pixel element has a non-linear response to the application of a predefined voltage, the method comprising the steps of:

determining the first period of time for which the pixel element has a non-linear response to the application of the predefined voltage;

subtracting the first period of time from a maximum time that the pixel element may have the predetermined voltage applied to it;

dividing the result of the subtracting step by N, the number of gray levels desired, the result of the dividing being an incremental time period for each gray level; and storing the incremental time period so that when a pixel must be activated, its gray level can be multiplied by the incremental time, and the product of the gray level multiplied by the incremental time added to the first period of time to provide the length of time that the predetermined voltage is applied to the pixel.

4. The method of claim 3 further comprising the step of programming a programmable table means, to allow different time periods to be in the table means for different monochrome video displays.

5. A controller for generating zero to N gray scales on a monochrome display, said monochrome display having an array of pixels, each pixel element being characterized by a first period of time for which the pixel element has a non-linear response to the application of a predetermined voltage, the predetermined voltage being applied to the pixels for various time intervals to generate the gray scales, the longest time interval being equal to the inverse of the refresh rate of the display, said controller receiving multi-bit color information, horizontal sync information, and clock information from a digital computer, the controller comprising:

table means for storing zero to N time periods, the N time periods corresponding to the zero to N gray scale levels, wherein the N time periods corresponding to gray scale levels two to N are dependent upon an incremental time period, the incremental time period being determined by the steps of:

determining a minimum baseline time for applying the predetermined voltage to a pixel element, the minimum baseline time corresponding to the time period necessary to apply the display voltage to charge pixel element to gray scale level one, the minimum baseline time being at least equal to the predetermined length during which the pixel has a non-linear response to the predetermined voltage;

subtracting the minimum baseline time from the longest time interval, the longest time interval corresponding to the time period necessary to apply the display voltage to charge the pixel element to the gray scale level N; and dividing the result of the subtracting step by N, the maximum gray level, the result being the incremental time;

converter means for receiving the multi-bit color information, horizontal sync information and clock information within the range of zero to N, the converter means being coupled to the table means and supplying the series of gray scale levels to the table means; and means for applying the display voltage to the pixels, the means for applying being coupled to the table means, the length of time the voltage is applied for gray scale level one corresponding to the minimum baseline time and the length of time the voltage is applied for gray scale levels two to N corresponding to the minimum baseline time added to the incremental time multiplied by two through N respectively.

6. The controller of claim 5 wherein the means for applying display voltage to the pixels is also coupled to receive the clock information and horizontal sync information from the computer to select the pixels to which the gray scale intensity level should be applied.

* * * * *

UNITED STATES PATENT AND TRADEMARK OFFICE
CERTIFICATE OF CORRECTION

PATENT NO. : 5,196,839
DATED : March 23, 1993
INVENTOR(S) : Arun Johary, et. al.

It is certified that error appears in the above-indentified patent and that said Letters Patent is hereby corrected as shown below:

Title page, item [73], Assignee: should read -- Half interests in Chips and Technologies, Inc., San Jose, California and ASC11 Corporation, Tokyo, Japan --.

Signed and Sealed this

First Day of August, 1995

Attest:

BRUCE LEHMAN

Attesting Officer       *Commissioner of Patents and Trademarks*